US008128498B2

(12) United States Patent
Aguilar, Jr. et al.

(10) Patent No.: US 8,128,498 B2
(45) Date of Patent: Mar. 6, 2012

(54) CONFIGURE OFFLINE PLAYER BEHAVIOR WITHIN A PERSISTENT WORLD GAME

(75) Inventors: Maximino Aguilar, Jr., Georgetown, TX (US); Charles R. Johns, Austin, TX (US); Mark R. Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 11/425,452

(22) Filed: Jun. 21, 2006

(65) Prior Publication Data
US 2007/0298886 A1 Dec. 27, 2007

(51) Int. Cl.
A63F 9/22 (2006.01)
(52) U.S. Cl. ............... 463/36; 463/42; 463/43; 709/202
(58) Field of Classification Search ................. 709/202; 463/40, 42, 36
See application file for complete search history.

(56) References Cited

U.S. PATENT DOCUMENTS

| | | | |
|---|---|---|---|
| 5,830,067 A * | 11/1998 | Graves et al. ................ 463/40 |
| 6,763,384 B1 | 7/2004 | Gupta et al. |
| 6,773,344 B1 | 8/2004 | Gabai et al. |
| 6,816,913 B1 | 11/2004 | Liebenow |
| 6,908,389 B1 * | 6/2005 | Puskala ..................... 463/40 |
| 7,192,351 B2 * | 3/2007 | Rozkin et al. ............... 463/40 |
| 2003/0177187 A1 | 9/2003 | Levine et al. |
| 2005/0004984 A1 * | 1/2005 | Simpson ................... 709/205 |
| 2005/0131837 A1 | 6/2005 | De Sanctis et al. |
| 2005/0245317 A1 | 11/2005 | Arthur et al. |
| 2006/0135259 A1 * | 6/2006 | Nancke-Krogh et al. ..... 463/42 |
| 2006/0135263 A1 | 6/2006 | Labrie |
| 2006/0224681 A1 | 10/2006 | Wurster |
| 2006/0259292 A1 | 11/2006 | Solomon et al. |
| 2007/0077993 A1 * | 4/2007 | Midgley et al. ............. 463/42 |
| 2007/0153715 A1 | 7/2007 | Covington et al. |
| 2008/0010635 A1 | 1/2008 | O'Brien et al. |

OTHER PUBLICATIONS http://replay.waybackmachine.org/20060106103511/http://secondlife.com/badgeo/wakka.php?wakka=Tutorial.*
http://replay.waybackmachine.org/20060520193314/http://secondlife.com/badgeo/wakka.php?wakka=LSL101Chapter1.*
http://replay.waybackmachine.org/20060512204222/http://secondlife.com/badgeo/wakka.php?wakka=CrashCourse9.*
http://replay.waybackmachine.org/20060106101647/http://secondlife.com/badgeo/wakka.php?wakka=events.*

(Continued)

*Primary Examiner* — Melba Bumgarner
*Assistant Examiner* — Lawrence Galka
(74) *Attorney, Agent, or Firm* — Stephen R. Tkacs; Stephen J. Walder, Jr.; Matthew B. Talpis

(57) ABSTRACT

A mechanism is provided for configuring offline player behavior within a persistent world game. A player agent for an offline player includes an event monitor that monitors for events that occur in a persistent virtual world maintained by a game server. When a game event occurs that triggers an offline player rule, the player agent may generate game events on behalf of the offline player. The player agent may also receive messages from an offline player. The messages may include commands for adding, removing, or editing offline player rules. A message may also include a command to view a list of rules or fire a one-time execution of a rule upon receipt. Therefore, a player may contribute to the persistent virtual world even when offline by sending commands using a messaging client or Web browser.

14 Claims, 9 Drawing Sheets

OTHER PUBLICATIONS http://replay.waybackmachine.org/20051101081256/http://secondlife.com/badgeo/wakka.php?wakka=Functions.*
http://replay.waybackmachine.org/20051029222325/http://secondlife.com/badgeo/wakka.php?wakka=IISay.*
U.S. Appl. No. 11/380,021, filed Apr. 25, 2006, Aguilar, Jr. et al.
U.S. Appl. No. 11/457,529, filed Jul. 14, 2006, Aguilar, Jr. et al.
U.S. Appl. No. 11/548,904, filed Oct. 12, 2006, Aguilar, Jr. et al.
"Networking and Communications Troubleshooting Remote Wake-up issues", Intel Corporation, http://web.archive.org/web/20050721030134/http://www.intel.com/support/network/sb/cs, 3 pages.
Berardini, Cesar A., "The Xbox 360 Dissected"http://features.teamxbox.com/xbox/1145/The-Xbox-360-Dissected/p2, May 12, 2005, 8 pages.
Lees, Jennie, "The hypervisor and its implications", http://xbox.joystiq.com/2005/11/29/the-hypervisor-and-its-implications, Nov. 29, 2005, 2 pages.
Rosenblum, Mendel et al., "Virtual Machine Monitors: Current Technology and Future Trends", IEE Computer Society, May 2005, pp. 40 and 46.
U.S. Appl. No. 11/380,021, Image File Wrapper printed on Jun. 4, 2010, 2 pages.
U.S. Appl. No. 11/457,529, Image File Wrapper printed on Jun. 4, 2010, 2 pages.
U.S. Appl. No. 11/548,904, Image File Wrapper printed on Jun. 4, 2010, 2 pages.

* cited by examiner

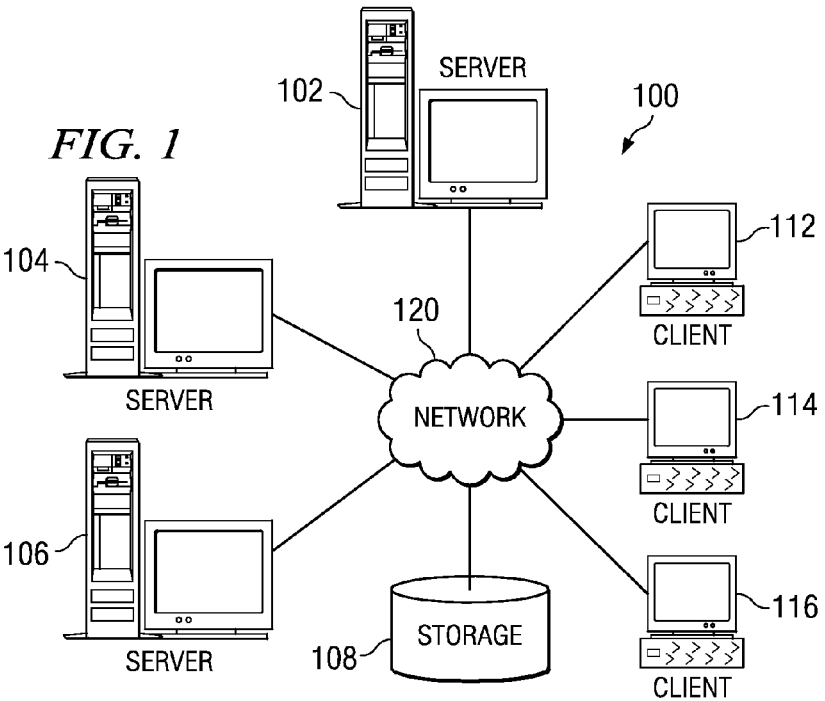

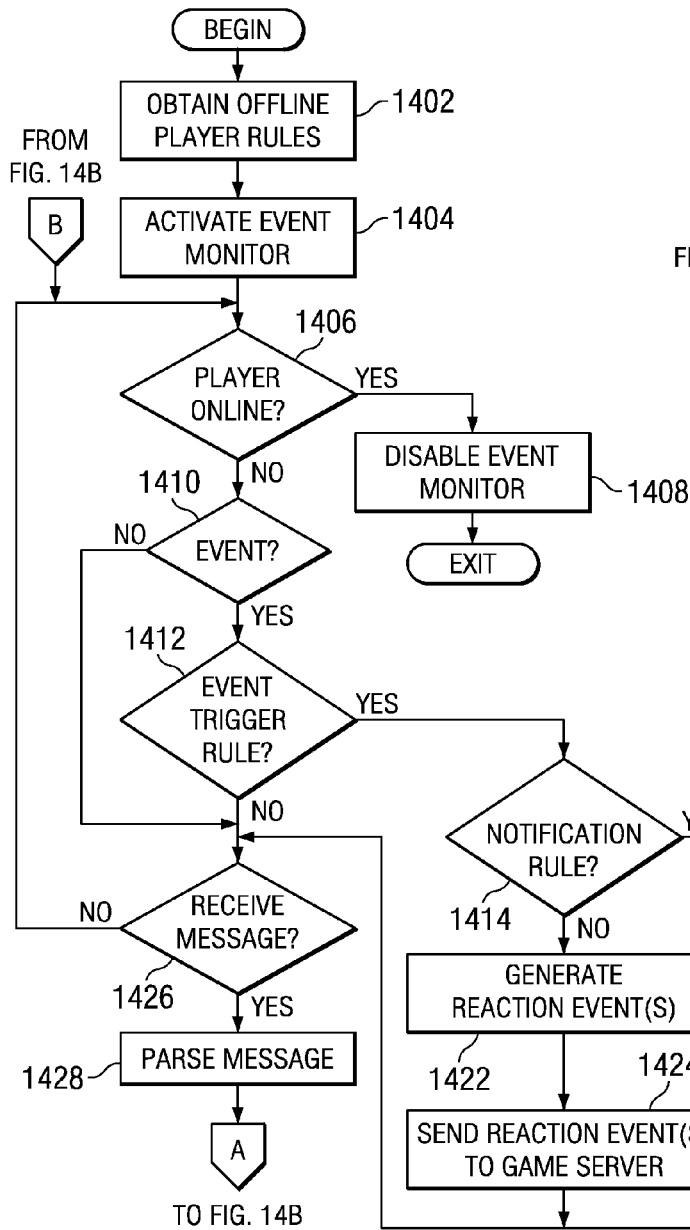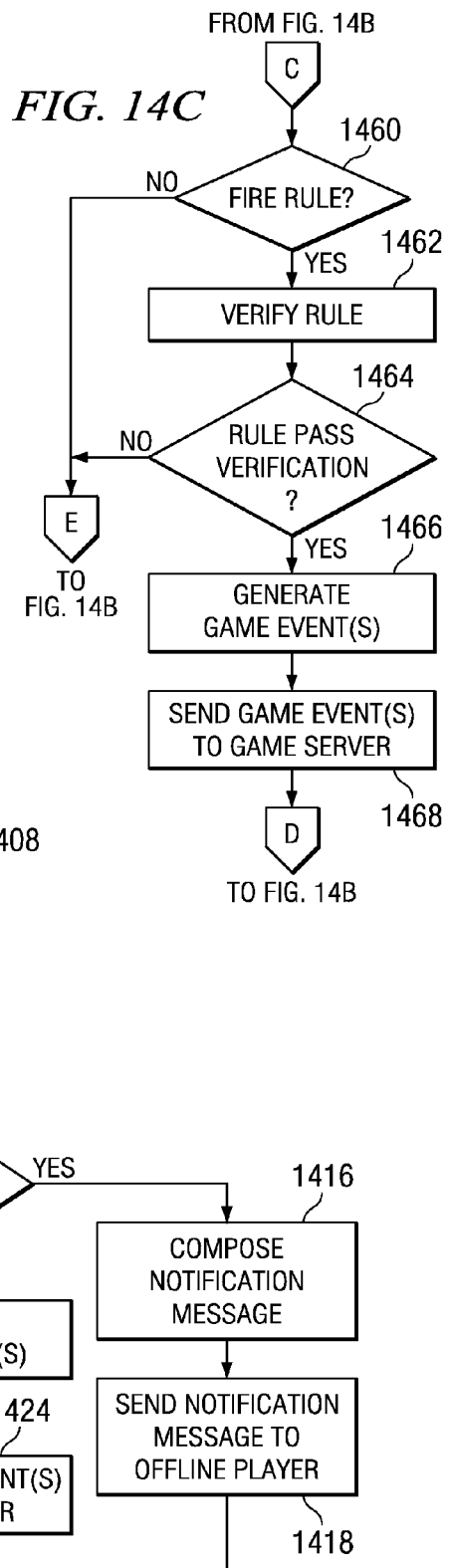

CONFIGURE OFFLINE PLAYER BEHAVIOR WITHIN A PERSISTENT WORLD GAME

BACKGROUND

1. Technical Field

The present application relates generally to an improved data processing system and method. More specifically, the present application is directed to a method, apparatus, and program product for configuring offline player behavior within a persistent world game.

2. Description of Related Art

A massively multiplayer online role playing game (MMORPG) is an online computer or console game in which a large number of players interact with one another in a virtual world. As in all role playing games (RPGs), players assume the role of a character and take control over most of that character's actions. The virtual world may be a fantasy setting, a science fiction universe, or the old west, for example.

The origin of multiplayer games may trace back to Dungeons & Dragons® or even tabletop war games. "Dungeons & Dragons" is a registered trademark of Wizards of the Coast in the United States, other countries, or both. The beginning of massively multiplayer online role playing games may be traced back to the multi-user dungeon (MUD), which is a text-based multiplayer game that uses a command line interface. However, with the rising acceptance of personal computers, as well as increased graphical capabilities of personal computers and video game consoles, massively multiplayer online role playing games have become wildly popular around the world. In fact, part of the draw of massively multiplayer online role playing games is that players from any continent may be online at any given time.

Massively multiplayer online role playing games distinguish from single-player or small multi-player role playing games by the game's persistent world. The persistent world is hosted by a server and continues to exist and evolve even when a given player is not logged in. Persistent worlds may also include non-player characters (NPCs), marketplaces, auction houses, buildings, animals, vehicles, etc. This results in a game world that is far more dynamic, diverse, realistic, and addictive than those of other games.

Players of persistent world games tend to invest a great deal of time in their online characters, in some cases to the detriment of their real-life counterparts. The player is considered online when the player is logged into the game server through a game client. Conversely, a player is considered offline when the player is not logged into the game server through a game client. A typical player performs tasks, such as completing quests, practicing skills or crafts, obtaining items, or selling items, to improve the attributes or status of the character. Often, players become obsessed with the virtual world, not wanting to miss particular events or to allow other players to surpass them in ability or wealth.

SUMMARY

In one illustrative embodiment, a method is provided for effecting offline player behavior within a persistent virtual world online game managed by a game server. The game server observes and generates game events for the persistent virtual world online game. The method comprises activating an offline player agent for an offline player. The offline player agent has an associated set of offline player rules. Each offline player rule in the set of offline player rules defines an action to be taken on behalf of the offline player in the persistent virtual world online game responsive to a specified game event. The player agent monitors for an occurrence of a game event corresponding to an offline player rule in the set of offline player rules. The occurrence of the game event triggers a corresponding offline player rule from the set of offline player rules. Responsive to the game event triggering the corresponding offline player rule, the offline player agent generates one or more offline player game events and sends the one or more offline player game events to the game server, as if the one or more offline player game events were generated by a game client device associated with the offline player., to effect an action on behalf of the offline player. Generating one or more offline player game events comprises generating a sequence of offline player game events under control of a script associated with the corresponding offline player rule. The method further comprises receiving, by the offline player agent, a command from the offline player in a message from a messaging client associated with the offline player. The command comprises a request to access the set of offline player rules. The method further comprises processing the command, and responsive to the command being processed successfully, generating a confirmation and sending the confirmation message to the messaging client associated with the offline player.

In another illustrative embodiment, an apparatus is provided for effecting offline player behavior within a persistent virtual world online game. The data processing system may comprise a game server that observes and generates game events for a persistent virtual world and an offline player agent that has an associated set of offline player rules. Each offline player rule in the set of offline player rules may define an action to be taken on behalf of the offline player in the persistent virtual world online game responsive to a specified game event. The offline player agent monitors for an occurrence of a game event corresponding to an offline player rule in the set of offline player rules. The occurrence of the game event triggers a corresponding offline player rule from the set of offline player rules. Responsive to the game event triggering the corresponding offline player rule, the offline player agent generates one or more offline player game events and sends the one or more offline player game events from the offline player agent to the game server, as if the one or more offline player game events were generated by a game client device associated with the offline player, to effect an action on behalf of the offline player. Generating one or more offline player game events comprises generating a sequence of offline player game events under control of a script associated with the corresponding offline player rule. The offline player agent receives a command from an offline player in a message from a messaging client associated with the offline player. The command comprises a request to access the set of offline player rules. The offline player agent processes the command, and responsive to the command being processed successfully, generates a confirmation and sends the confirmation message to the messaging client associated with the offline player.

In other exemplary embodiments, the apparatus performs various ones of the operations outlined above with regard to the method in the illustrative embodiments.

In another illustrative embodiment, a computer program product comprising a computer useable medium having a computer readable program is provided. The computer readable program, when executed on a computing device, may cause the computing device to activate an offline player agent for an offline player. The offline player agent has an associated set of offline player rules. Each offline player rule in the set of offline player rules defines an action to be taken on behalf of the offline player in the persistent virtual world online game responsive to a specified game event. The computer readable program may further cause the computing device to monitor, by the offline player agent, for an occurrence of a game event corresponding to an offline player rule in the set of offline player rules. The occurrence of the game event triggers a corresponding offline player rule from the set of offline player rules. The computer readable program may further cause the computing device, responsive to the game event triggering the corresponding offline player rule, to generate by the offline player agent one or more offline player game events and send the one or more offline player game events from the offline player agent to the game server, as if the one or more offline player game events were generated by a game client device associated with the offline player, to effect an action on behalf of the offline player. Generating one or more offline player game events comprises generating a sequence of offline player game events under control of a script associated with the corresponding offline player rule. The computer readable program further causes the computing device to receive, by the offline player agent, a command from the offline player in a message from a messaging client associated with the offline player. The command comprises a request to access the set of offline player rules. The computer readable program further causes the computing device to process the command, and responsive to the command being processed successfully, generate a confirmation and send the confirmation message to the messaging client associated with the offline player.

In other exemplary embodiments, the computer readable program may cause the computing device to perform various ones of the operations outlined above with regard to the method in the illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of an exemplary distributed data processing system in which aspects of the illustrative embodiments may be implemented;

FIG. 2 is a block diagram of an exemplary data processing system in which aspects of the illustrative embodiments may be implemented;

FIGS. 14A-14C present a flowchart illustrating operation of a player agent for configuring offline player behavior within a persistent world game in accordance with an illustrative embodiment.

DETAILED DESCRIPTION OF THE ILLUSTRATIVE EMBODIMENTS

Figure 3:
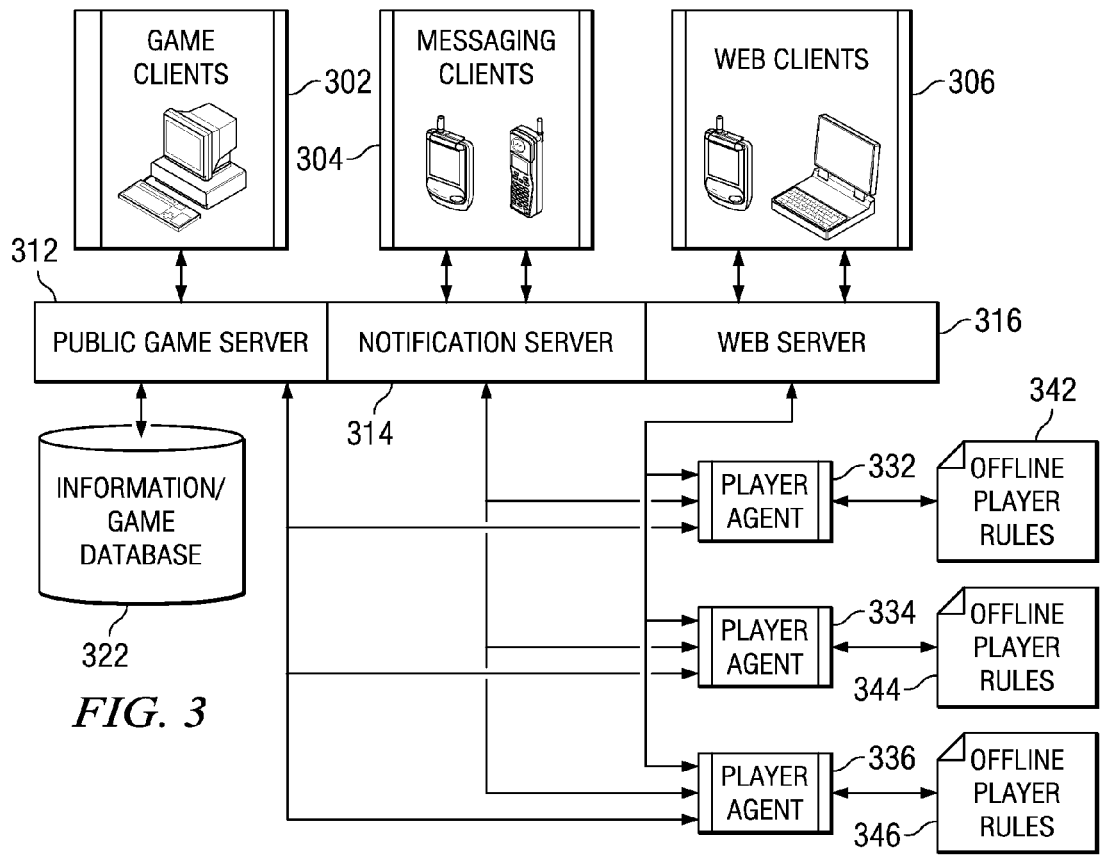
FIG. 3 is a block diagram illustrating a multiplayer online persistent world game environment in accordance with an exemplary embodiment.

The illustrative embodiments described hereafter provide a mechanism for configuring offline player behavior within a persistent world game. As such, the illustrative embodiments may be implemented in a distributed data processing environment in which multiple computing devices are utilized along with one or more data networks. Accordingly, FIGS. 1 and 2 hereafter are provided as examples of a distributed data processing environment and computing devices in which exemplary aspects of the illustrative embodiments may be implemented. FIGS. 1 and 2 are only exemplary and are not intended to state or imply any limitation with regard to the types and/or configurations of computing devices in which the illustrative embodiments may be implemented. Many modifications to the computing devices and environments depicted in FIGS. 1 and 2 may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 120, which is the medium used to provide communication links between various devices and computers connected together within distributed data processing system 100. The network 120 may include connections, such as wire, wireless communication links, or fiber optic cables.

In the depicted example, servers 102, 104, and 106 are connected to network 120 along with storage unit 108. In addition, clients 112, 114, and 116 are also connected to network 120. These clients 112, 114, and 116 may be, for example, personal computers, network computers, or the like. In the depicted example, server 102 may provide data, such as boot files, operating system images, and applications to the clients 112, 114, and 116. In this instance, clients 112, 114, and 116 are clients to server 102 in the depicted example. Distributed data processing system 100 may include additional servers, clients, and other devices not shown.

More particularly, distributed data processing system 100 may provide a massively multiplayer online game environment. Server 102 may provide a game server for maintaining a persistent virtual world for clients 112, 114, 116. A persistent virtual world is a representation of an environment with which players interact. The virtual world is persistent because the environment continues to exist and evolve even when a given player is not logged in. Server 102 may run game server software and maintain a database in storage 108 to track the states of objects, structures, and characters in the persistent virtual world.

Clients 112, 114, 116 may run game client software that a player uses to interact with the persistent virtual world. Clients 112, 114, 116 may render a two-dimensional or three-dimensional representation of the persistent virtual world, although clients 112, 114, 116 may also represent the virtual world using text, as in earlier multi-user dungeons (MUDs). The player typically interacts with the virtual world on behalf of, or from the perspective of, the player's character. In three-dimensional game environments, the player's character is represented by a three-dimensional player model. A significant draw of three-dimensional multiplayer online games is the ability to customize the appearance of the player model, which is also referred to as an "avatar." The players may initially customize the appearance of the player model by selecting facial features, body style, hair color, hair style, facial hair, and the like. Throughout the game experience, the player model may evolve, just as the virtual world itself evolves. For example, the player may add armor, weapons, clothing, functional enhancements, or companions, such as pets.

The player is considered online when the player is logged into the game server through a game client. Conversely, a player is considered offline when the player is not logged into the game server through a game client. While online, players may interact with the virtual world through commands, keystrokes, or mouse clicks. For example, a common user interface for massively multiplayer online role playing games is the WASD interface, where the virtual world is rendered from the perspective of the player's character and the "W" key moves the character forward, the "A" key turns the character left, the "S" key moves the player backward, and the "D" key moves the player right. Other user interfaces may use the cursor keys, mouse look, a top-down third-party perspective, a chase camera perspective, or other known interface techniques.

Whenever a player character interacts with the virtual world, an event is generated and sent to the game server, e.g., server 102. For instance, if a player at client 112 casts a spell on the character of the player at client 114, either a healing spell or an attack, an event is generated at client 112 and sent to server 102. Server 102 then generates an event and sends it to client 114. Server 102 also keeps track of the position, orientation, and status of each structure, character, and item. The evolution of the virtual world is the result of events. A database contains the current state of the virtual world. The events cause changes to the virtual world and, thus, the database. The role of the game client is essentially to represent these events graphically (or textually) to allow the player to monitor for events that are relevant to that player's character and to perform appropriate actions by interacting with the game client.

In one illustrative embodiment, server 104 runs a notification server. Each player may configure a player agent with a set of offline rules. The player agent may run on game server 102, notification server 104, or one of clients 112, 114, 116. The player agent monitors the events and applies the set of offline rules. If an event occurs that matches an offline rule, notification server 104 may generate a message. Notification server 104 then sends the message to the offline player. The message may be, without limitation, an electronic mail message, an instant message, a voice message, or a wireless phone message.

In another exemplary embodiment, server 106 may run a Web server application, which provides Web-based user interfaces for configuring rules or reading or composing messages for notification server 104. Thus, a player may configure the set of offline rules while at work through a Web interface without the need for a heavy, graphics-intensive game client. Alternatively, a player may configure offline rules through the game client itself or a specialized client application.

While the depicted example shows the game server, the notification server, and the Web server as separate physical devices, these servers, or various combinations of these servers, may actually be server applications running on the same physical device. For example, the game server and notification server may both run on server 102 and the Web server may run on server 104. Alternatively, the notification functionality may be integrated within the game server on server 102.

In the depicted example, distributed data processing system 100 is the Internet with network 120 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 102 or client 112 in FIG. 1, in which computer usable code or instructions implementing the processes for illustrative embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, video game consoles, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is a block diagram illustrating a multiplayer online persistent world game environment in accordance with an exemplary embodiment. Public game server 312 provides a massively multiplayer online game to game clients 302. Players interact with the persistent virtual game world through game clients 302, which may provide text-based or graphical user interfaces for representing the persistent virtual game world to the player. Current popular game clients represent virtual game worlds as three-dimensional environments. The persistent game world may be, for example, a medieval fantasy setting, a futuristic science fiction universe, the old west, a super hero universe, or any other environment that is suitable for a multiplayer online game.

Game clients 302 may be, for example, personal computers or video game consoles. Personal computers, as referred to herein, may include desktop computers, laptop computers, or any other computing device that is capable of running a game client application. A video game console is a specialized computing device that is used to play video games. The game software itself may be available on a compact disc (CD) or digital video disc (DVD). Earlier game machines used cartridges containing read only memory (ROM) chips. Although video game consoles may be powered by similar processor chips as desktop computers, the hardware is under the entire control of the respective manufacturer, and the software is specific to the machine's capabilities. Video game consoles may also include hand-held video game devices, which are self-contained devices with audio capabilities and displays built-in.

As the persistent virtual game world evolves through interaction by the players and other events, such as scripted actions by non-player characters (NPCs), public game server 312 observes the interactions and may generate events. Public game server 312 then records the results of the events in information/game database 322. Public game server 312 may also broadcast events to all of the online players affected by the events within game clients 302. In most current implementations, the persistent virtual game world is divided into "zones." Thus, while there may be over 2,000 players online at a given time, there may only be 200 players in a particular zone. Therefore, when an event occurs in that zone, such as a player attacking a non-player merchant character, public game server 312 may broadcast the event to only the players in that zone. A person of ordinary skill in the art will recognize that the manner in which game events are distributed to online player clients is not a focus of this disclosure.

In current massively multiplayer online games, offline player presence is severely limited. At best, a player may place an item up for auction and the auction house may sell the item on behalf of the player while the player is offline. However, offline player activity is limited to only selling items in the auction house and the offline activity must be configured through the game client while the player is online. In other implementations, the player must leave his or her client device logged in to allow the character to sell an item, for instance, or to perform any other action. This causes subscribers to feel a sense of loss whenever they are offline. That is, while a player is unable to have an online presence in the virtual game world, she may be missing critical events. For example, a player may return home from a long walk in the park to find out that her home city in the virtual world has been overrun by the enemy.

In accordance with an exemplary embodiment, player agents 332, 334, 336 use offline player rules 342, 344, 346 to monitor for events that are relevant to particular offline players. For example, each one of player agents 332, 334, 336 may execute on behalf of a corresponding offline player. Player agents 332, 334, 336 may execute, for example, in game clients 302, public game server 312, notification server 314, or combinations thereof. The offline players configure offline player rules 342, 344, 346 to define what types of events are relevant, as well as how, when, and/or where event notifications are to be distributed. For instance, a particular player configures player agent 332 with offline player rules 342.

Player agent 332 monitors events observed by and generated by public game server 312 or specific changes to the virtual world persisted to information/game database 322. That is to say that public game server 312 manages game events by observing them, generating them, or persisting them to game database 322. If an event occurs that satisfies one of the set of offline player rules 342, player agent 332 generates an event notification message. In one exemplary embodiment, if an event satisfies more than one rule, then player agent 332 may combine the resulting event notifications into a single message. Alternatively, the player agent may generate a separate event notification message for each player rule that is triggered.

Notification server 314 may deliver event notification messages to messaging clients 304. Event notification messages may include, without limitation, electronic mail messages, instant messages, voice mail messages, facsimile transmissions, or wireless phone messages. As an example, player agent 332 may compose an electronic mail message containing the event information, and notification server 314 may deliver it to one of message clients 304, through an electronic mail server, using the simple mail transfer protocol (SMTP). As another example, notification server 314 may deliver an event notification message to a group of messaging clients 304 through Internet relay chat (IRC). As yet another example, notification server 314 may deliver an event notification message to a short message service (SMS) client. A person of ordinary skill in the art will recognize that other known messaging techniques may be used.

Messaging clients 304 may be any client devices capable of receiving event notification messages. More particularly, messaging clients 304 may include, without limitation, personal computers, telephone devices, personal digital assistants, push email client devices, set-top television devices, or video game consoles. As an example, an offline player may receive a text message on his wireless telephone notifying him that his base is being attacked by the enemy. As a further example, a particular player may receive an email at work notifying her that a particular non-player character has appeared in the same zone as her character.

In one exemplary embodiment, players may configure offline player rules 342, 344, 346 using the game client applications on game clients 302. That is, the game client software may provide user interfaces for setting offline player rules. For example, a player may indicate whether event notification messages are to be sent to a particular wireless phone number, email address, or instant messaging identification. Offline player rules may also define whether notification messages shall include text, image, or voice, for example. A player may also define what types of events shall trigger event notification.

In another exemplary embodiment, web serer 316 may provide Web-based user interfaces for configuring offline player rules 342, 344, 346. Thus, players may configure offline rules while at work using Web clients 306 without the need for a graphics-intensive game client application. Web clients 306 may include, without limitation, personal computers, Web-enabled wireless phone devices, or set-top television devices.

In accordance with another illustrative embodiment, player agents 332, 334, 336 may generate events on behalf of offline players according to offline player rules 342, 344, 346. Players may configure offline player rules 342, 344, 346 with actions to be taken while the player is offline. Thus, the player's character may have a presence within the persistent virtual world even when the player is offline. If an event occurs that matches one of the offline player rules of a given character, the respective player agent may generate one or more events if the offline player rule calls for an action to be taken. The player agent then may send the one or more events to public game server 312 as if the event was generated by a game client for an online character.

In particular embodiments, an offline character may be represented in the persistent virtual game world just as a non-player character is represented. This may actually enhance the game experience, because players may provide interesting game content through the actions taken according to offline player rules. For instance, players may contribute to the persistent virtual world even while offline by providing offline player rules that offer quests to online characters. Offline players may dance for a few coins or upgrade armor for a price, for example. Alternatively, offline players may perform scripted actions to add to the overall story of the virtual world. In a sense, through careful configuration of offline player rules, a player's character may become a non-player character (NPC) while the player is offline.

The game provider may constrain the actions that may be taken by an offline player agent. Current game providers are very concerned with players who attempt to find exploits in the game mechanics to unfairly improve a character or gain wealth in the virtual world. Therefore, a game provider in some instances may wish to limit offline player behavior to simple tasks, such as performing emotional or social actions, referred to as "emotes," using craft skills, participating in scripted conversations, buying and selling, or combinations thereof. Alternatively, the game provider may allow users to perform most actions as an offline player, but may prohibit attribute or skill increases that may result.

In another exemplary embodiment, offline players may add, modify, remove, or receive a list of offline player rules using messaging clients 304. When a player issues a message from one of messaging clients 304, notification server 314 may forward the message to the respective player agent 332, 334, 336. In response to appropriate incoming messages, player agents 332, 334, 336 may update offline player rules 342, 344, 346.

The game provider sees an added benefit, because an active community of players will provide a virtual environment that is truly built and shaped by the players. While game providers may still provide non-player characters, quests, expansions, and the like, the game community will be fueled by the imaginations of the subscribers. As a result, the game providers may experience a reduction in the cancellation rate of account memberships.

Figure 4:
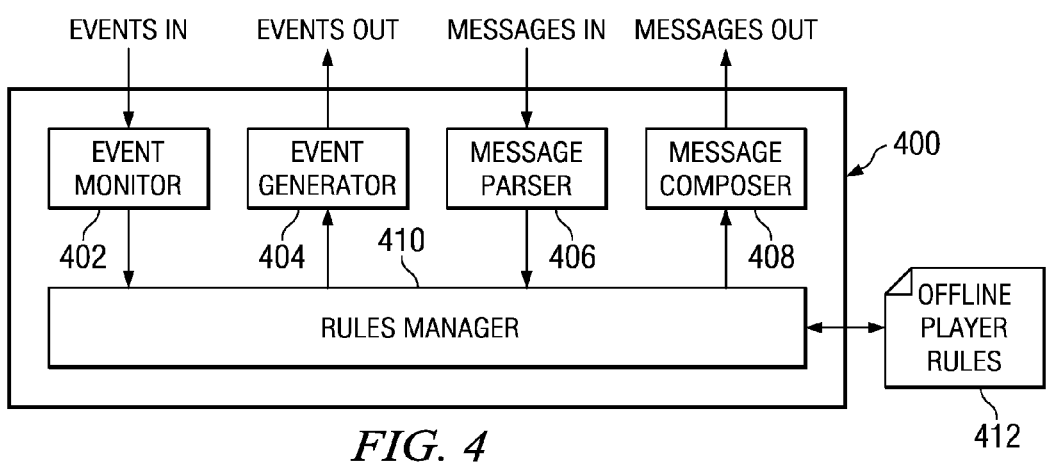
FIG. 4 is a block diagram illustrating the functional components of a player agent in accordance with an exemplary embodiment.

FIG. 4 is a block diagram illustrating the functional components of a player agent in accordance with an exemplary embodiment. Player agent 400 includes event monitor 402, event generator 404, message parser 406, message composer 408, and rules manager 410. Event monitor 402 receives events that are observed and generated by the public game server. Rules manager 410 performs a check against offline player rules 412 to determine if an incoming game event matches a rule.

If a game event received from event monitor 402 matches one of offline player rules 412, rules manager triggers message composer 408 to compose an event notification message. Message composer 408 may simply formulate a text message using a template, for example. In addition, message composer 408 may include in the message an image, such as a still image of the current state of the game or an image of an item, based on the active rule from offline player rules 412. The rules may also include a text message, sound file, or the like to send as the message or attached to the message. This allows the user to customize the message he receives, much like a ring tone may identify a caller. Further, if indicated within the active rule, message composer 408 may perform text-to-speech conversion and output the event notification message as a sound file, telephone call, or voice mail. Message composer 408 then provides the generated message to the notification server.

Message parser 406 receives incoming messages that may add, modify, or remove rules in offline player rules 412. Message parser 406 parses the message according to templates or a predefined syntax, for example. In response to appropriate incoming messages, rules manager 410 updates offline player rules 412. For example, rules manager 410 may add more detailed events, request a still image or short video, etc.

In another illustrative embodiment, rules manager 410 may signal event generator 404 to generate game events on behalf of the offline player. In response to a particular rule being activated from offline player rules 412, or in response to an appropriate incoming message, rules manager 410 may activate event generator 404 to send a game event to the public game server as if the event were generated by an online player's game client.

Figure 5:
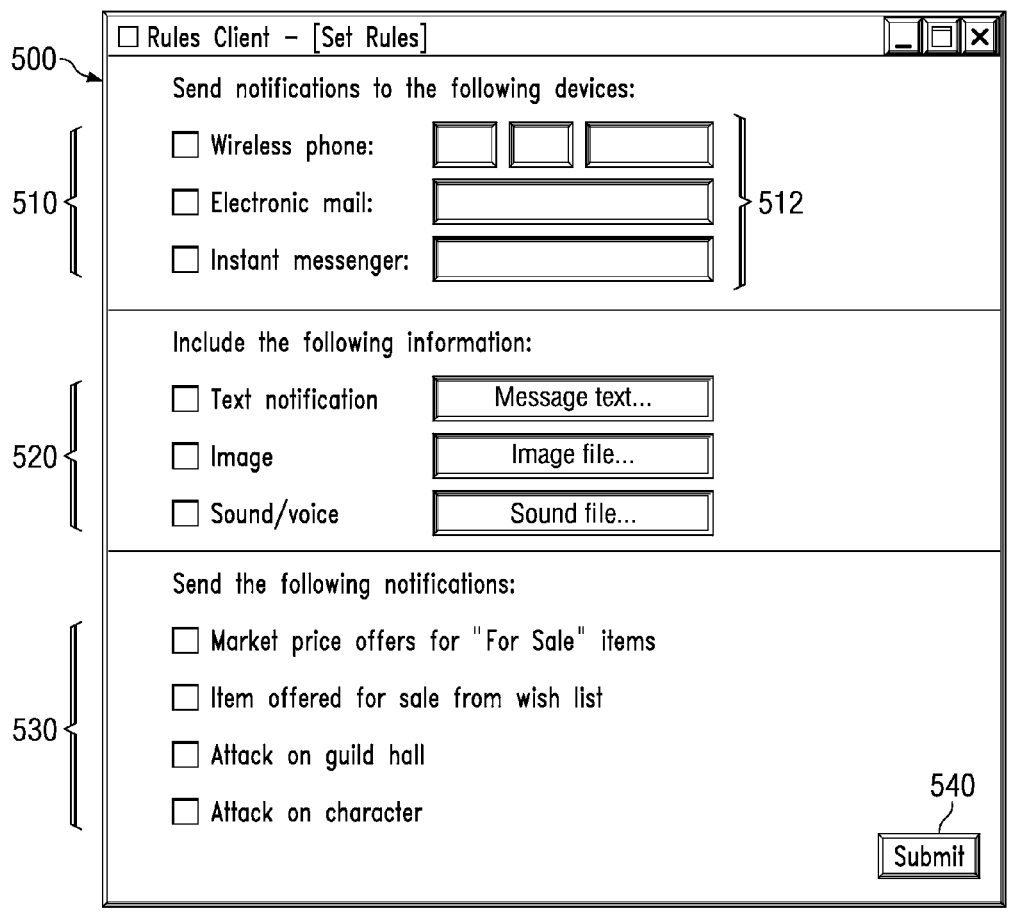
FIG. 5 depicts an event notification rule configuration user interface in accordance with accordance with an illustrative embodiment.

FIG. 5 depicts an event notification rule configuration user interface in accordance with accordance with an illustrative embodiment. Rules client window 500 provides an interface through which a player may configure offline player rules for event notification. Rules client window 500 may be presented through a game client application running on one of game clients 302 in FIG. 3, a Web browser running on one of Web clients 306 in FIG. 3, or a stand-alone application, for example.

Rules client window 500 includes a contact information portion 510, a message content portion 520, and a notification type portion 530. In contact information portion 510, the player may indicate whether he or she wishes to receive game event notifications by wireless phone, electronic mail, or instant messenger. The player may provide the contact information in text entry fields 512. As an example, a player may check the "Wireless phone" box and enter a telephone number in the appropriate field. Contact information portion 510 may include more or fewer options depending upon the implementation.

Message contact portion 520 allows a player to indicate whether the message should include a text notification, an image, or voice. In an exemplary implementation, the player may check all three selections. If the "Image" selection is checked, the notification service may provide an image of an item or a screen capture from a game client of a nearby online player, for example. Alternatively, the game server may be configured to generate a low resolution image, for instance. If the "Voice" selection is checked, the notification service may perform text-to-speech conversion and provide the event notification message as a voice message or voice mail. Message contact portion 520 may also include fields to allow the user to specify message text, an image file, or sound file.

Notification type portion 530 allows a player to indicate what types of events should result in a notification message. In the depicted example, the types of notification events include a market price offer to buy an item the player is selling, an offer to sell an item the player has on a wish list, an attack on the player's guild hall, and an attack on the player's character. Notification type portion 530 presents a small number of checkboxes for simplicity; however, a person of ordinary skill in the art will appreciate that the catalogue of possible event types may be quite extensive and will likely include many more event types and more detailed and complicated rules. In an alternative embodiment, notification type portion 530 may include a notification entry interface that allows the player to customize notification types.

Figure 6:
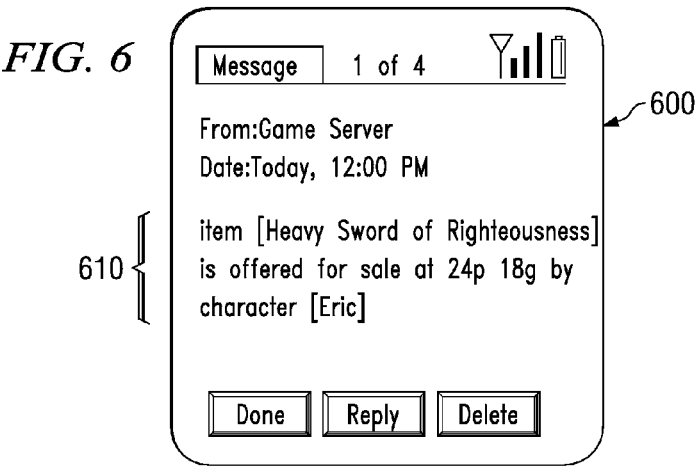
FIG. 6 depicts a notification event message presented on a wireless phone display in accordance with an exemplary embodiment.

FIG. 6 depicts a notification event message presented on a wireless phone display in accordance with an exemplary embodiment. Message display 600 may be presented on one of messaging clients 304 in FIG. 3, for example. Message display 600 includes a text message display portion, which includes event notification content 610. In the depicted example, the event notification alerts the player that a particular item is being offered for sale. The event notification also informs the player of the character offering the item for sale and the price.

Figure 7:
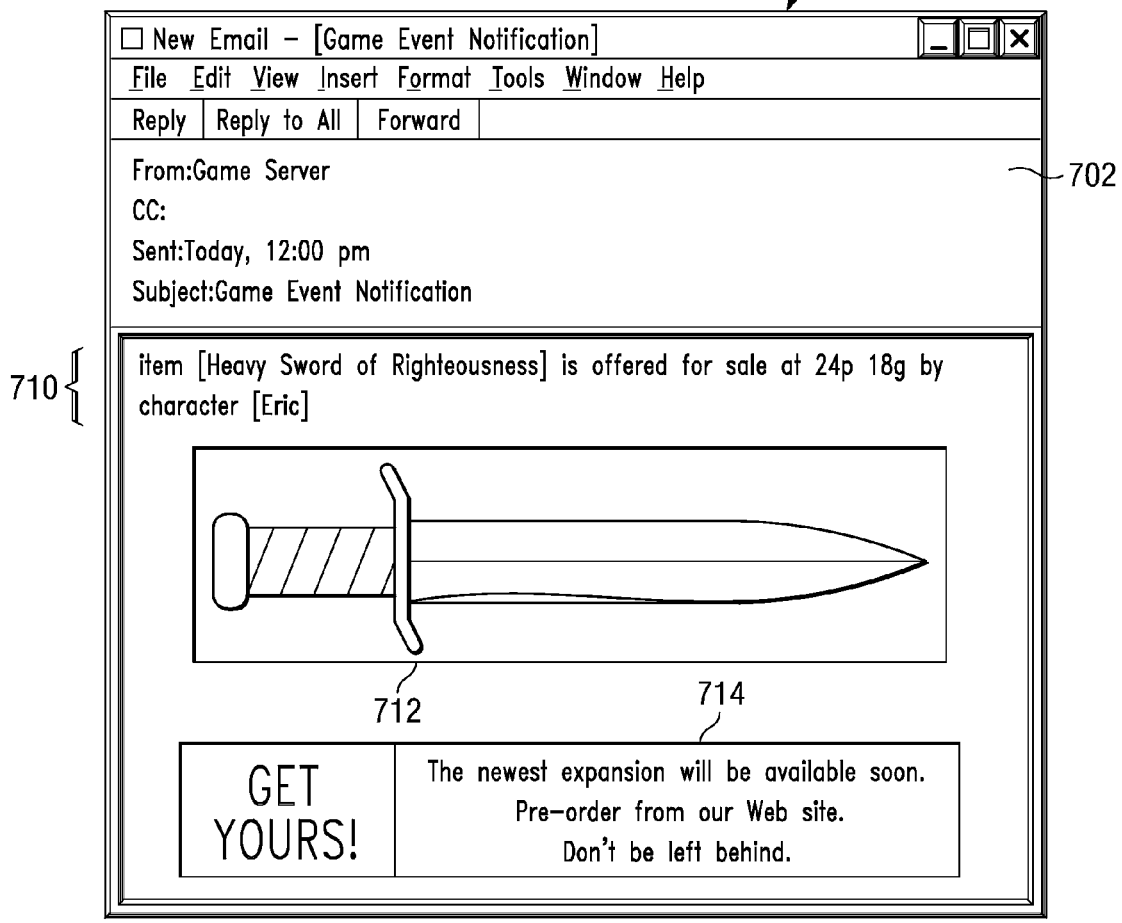
FIG. 7 depicts a notification event message presented as an electronic mail message in accordance with an exemplary embodiment.

FIG. 7 depicts a notification event message presented as an electronic mail message in accordance with an exemplary embodiment. Electronic mail window 700 may be presented on one of messaging clients 304 or one of Web clients 306 in FIG. 3, for example. Electronic mail window 700 includes message portion 702. Message portion 702 presents message header information and message content. The message content includes event notification content 710. In the depicted example, the message content 710 is also accompanied by image 712. In this instance, image 712 is of the item being offered for sale. In addition, in this example, the message portion also includes banner advertisement 714. The game provider may use the event notification messages as a vehicle to advertise related products or to sell advertising to partners.

In the depicted example, image 712 is of a particular item being offered for sale. However, the image may be any type of image related, or perhaps unrelated, to the event notification. For example, players may offer photographs to be used in character profiles. As another example, image 712 may be an illustration that is reasonably associated with the particular event.

As another example, the image may be a screen capture taken by a nearest online player to the event or by the game server. For instance, if an online character offering the item for sale happens to be looking at the offline player's character when making the offer, the game server may instruct the online character's game client application to take a low resolution screen capture and send the screen capture image to the player agent composing the message. Alternatively, if the offline character's city is attacked, the image may be a screen capture by a nearest online bystander, the offline player character's point of view, or even an attacker, showing the ruin left in the wake of the attack. In this manner, the event notification message may provide significant persistent world information to an offline player through standard communications channels outside the game world.

Figure 8:
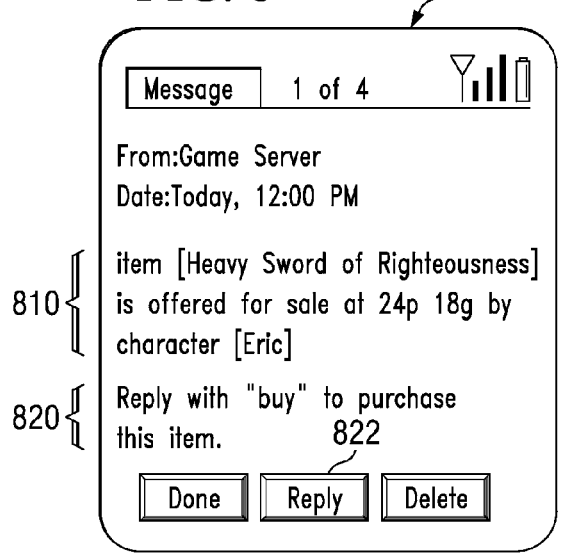
FIG. 8 depicts a notification event message with reply instructions presented on a wireless phone display in accordance with an exemplary embodiment.

FIG. 8 depicts a notification event message with reply instructions presented on a wireless phone display in accordance with an exemplary embodiment. Message display 800 may be presented on one of messaging clients 304 in FIG. 3, for example. Message display 800 includes a text message display portion, which includes event notification content 810 and reply instructions 820. In the depicted example, the event notification alerts the player that a particular item is being offered for sale. The event notification also informs the player of the character offering the item for sale and the price.

Reply instructions 820 tell the player how to send a message into the event notification server to perform an offline action responsive to the event. In this example, the player may select "Reply" button 822 and reply to the message with the word "buy" to purchase the item.

Figure 9:
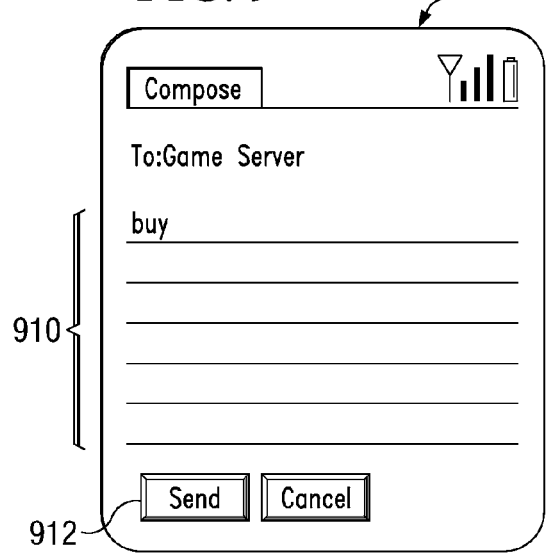
FIG. 9 depicts a reply message for performing an offline action on a wireless phone display in accordance with an exemplary embodiment.

FIG. 9 depicts a reply message for performing an offline action on a wireless phone display in accordance with an exemplary embodiment. Message composition display 900 may be presented on one of messaging clients 304 in FIG. 3, for example. Message composition display 900 includes message entry portion 910. The player may enter a message to the game server in message entry portion 910. In the depicted example, the player enters the word "buy" in response to a particular offer for sale; however, the message may comprise specific instructions for offline player actions or rules. In particular, the player may use templates or a specific syntax for composing messages. When message composition is complete, the player may select "Send" button 912 to send the message to the event notification server. When the event notification server receives, the message, the event notification server may generate a game event, as discussed above.

Figure 10:
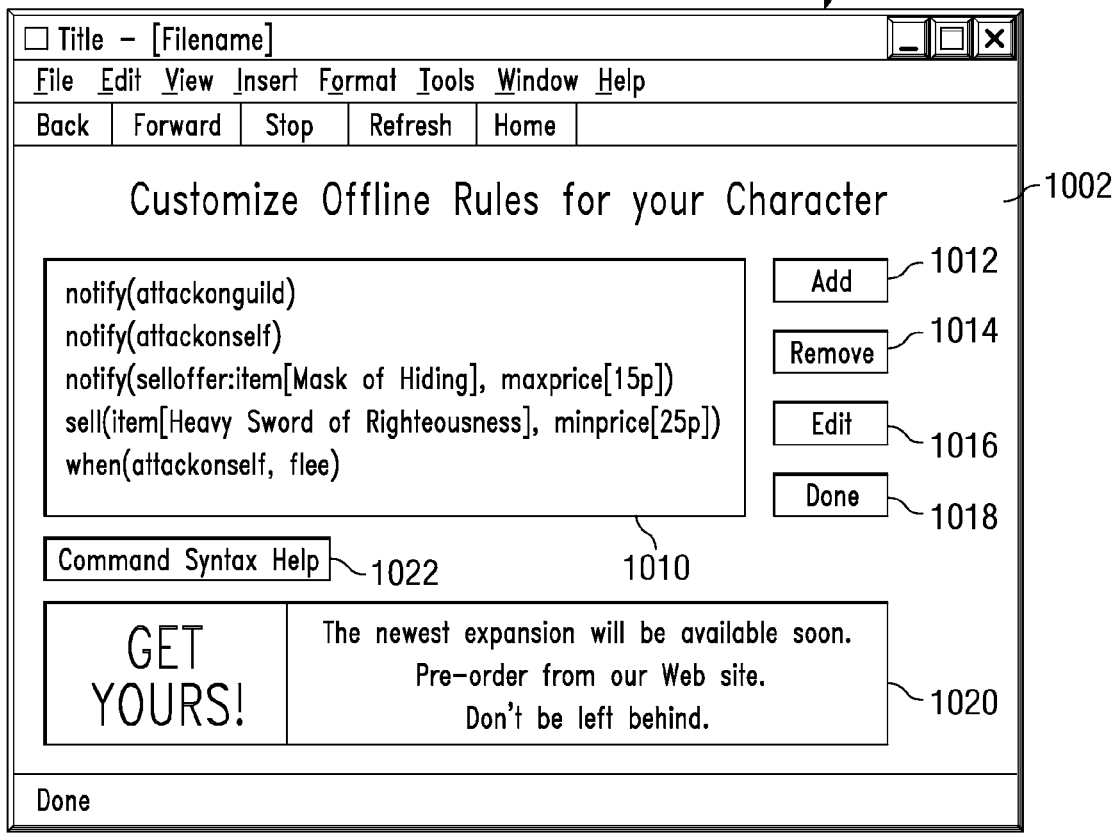
FIG. 10 depicts a Web-based offline player rule customization interface in accordance with an exemplary embodiment.

FIG. 10 depicts a Web-based offline player rule customization interface in accordance with an exemplary embodiment. The rule customization interface may be presented as a Web page in a Web browser application interface running on one of Web clients 306 in FIG. 3, for example. Web browser window 1000 includes display area 1002 in which the offline player rule customization interface may be presented.

The offline player rule customization interface includes rules list portion 1010, "Add" button 1012, "Remove" button 1014, "Edit" button 1016, and "Done" button 1018. The existing rules are listed in rules list portion 1010. Selecting "Add" button 1012 may cause the Web client to generate another interface for entering a specific offline player rule. The interface (not shown for simplicity) for entering a specific offline player rule may be, for example, a simple text entry field. However, given the number of possible rules in a typical massively multiplayer online game, the interface for entering a rule may include radio buttons, check boxes, drop-down menus, and the like.

The player may select a rule in rule list portion 1010 and select "Remove" button 1014 to remove the list from the list. Selecting a rule from rule list portion 1010 and selecting "Edit" button 1016 may generate an interface for entering rule information similar to that described above for adding a rule. When the player is finished adding, removing, and editing rules, the player may select "Done" button 1018 to persist the rules to the offline player agent, which may reside locally on the game client or may reside at the game server or event notification server, as described above.

The player may also select "Command Syntax Help" button 1022 to view a help dialog. Since the number and complexity of the commands may be more than can be remembered by a casual user, the help dialog may present a list of commands and guidelines for the syntax. The help dialog may also include other information, such as frequently asked questions, troubleshooting information, example commands, templates, etc.

In addition, display area 1002 may also present banner advertisement 1020. As stated above, the game provider may use the event notification messages as a vehicle to advertise related products or to sell advertising to partners.

Figure 11:
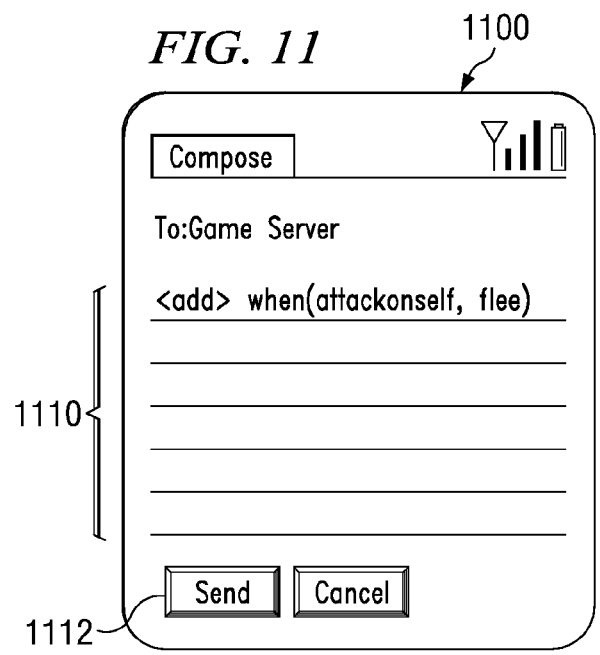
FIG. 11 depicts a message for composing an offline player rule on a wireless phone display in accordance with an exemplary embodiment.

FIG. 11 depicts a message for composing an offline player rule on a wireless phone display in accordance with an exemplary embodiment. Message composition display 1100 may be presented on one of messaging clients 304 in FIG. 3, for example. Message composition display 1100 includes message entry portion 1110. The player may enter a message to the game server in message entry portion 1110. Commands comprise requests to access the set of offline player rules. In the depicted example, the player enters the command "<add> when(attackonself, flee)" to submit an offline player rule to be used by a player agent. In particular, the player may use templates or a specific syntax for composing messages.

The command editing commands may include "add," "delete," "change," "and "view rules" commands. Thus, the user may compose a message beginning with "<add>" followed by the command to be added, for example. Other commands may be possible, such as "fleenow," "attack," and so forth, depending on the commands of the game client. Many online persistent world game clients include a command-line interface, although it is usually hidden from the user in the default interface. When message composition is complete, the player may select "Send" button 1112 to send the message to the player agent through the event notification server.

Figure 12:
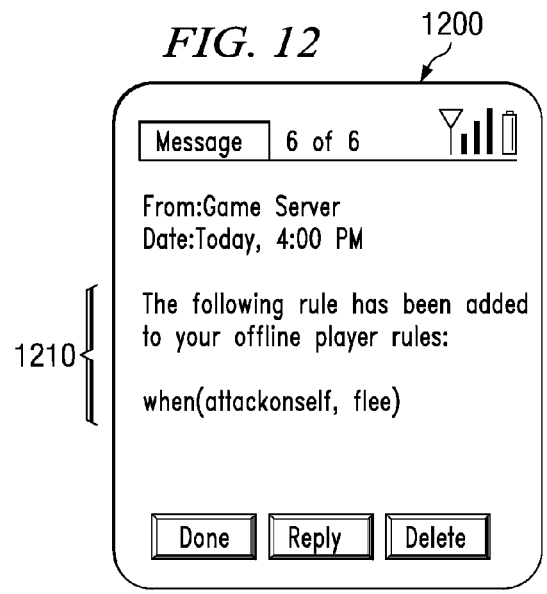
FIG. 12 depicts a message confirming an offline rules configuration action in accordance with an exemplary embodiment.

FIG. 12 depicts a message confirming an offline rules configuration action in accordance with an exemplary embodiment. Message display 1200 may be presented on one of messaging clients 304 in FIG. 3, for example. Message display 1200 includes a text message display portion, which includes rule configuration confirmation content 1210. In the depicted example, the confirmation message informs the player that a rule has been successfully added to the player's offline player rules.

FIGS. 13A-13F are block diagrams illustrating examples of operation of a player agent for configuring offline player rules in accordance with an illustrative embodiment. More particularly, with reference to FIG. 13A, player agent 1310 maintains offline player rules 1312. Player agent 1310 receives the following command message from an offline player:

<add> when(attackonself, flee)

Figure 13A:
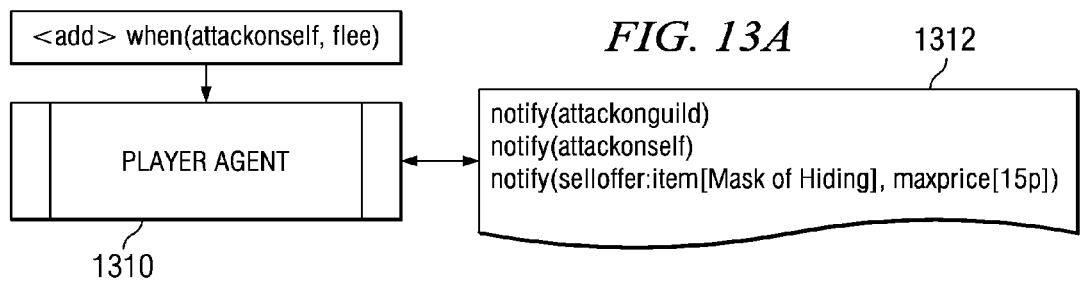
FIGS. 13A-13F are block diagrams illustrating examples of operation of a player agent for configuring offline player rules in accordance with an illustrative embodiment.
Figure 13B:
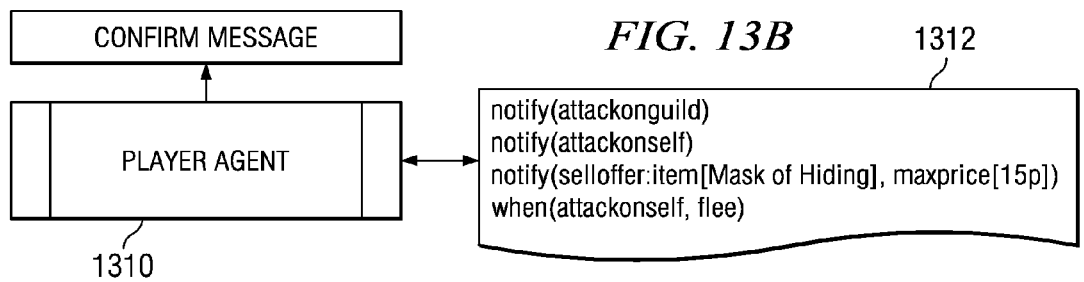

Turning to FIG. 13B, player agent 1310 adds the rule "when (attackonself, flee)" to offline player rules 1312. When the add operation is successful, player agent 1310 generates a confirmation message. Also note that if the operation is not successful, player agent 1310 may generate an error message.

Figure 13C:
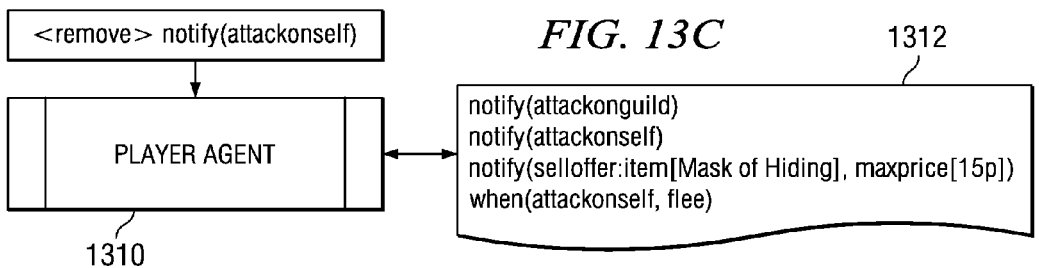

With reference now to FIG. 13C, player agent 1310 receives the following command from an offline player:

<remove> notify(attackonself)

Figure 13D:
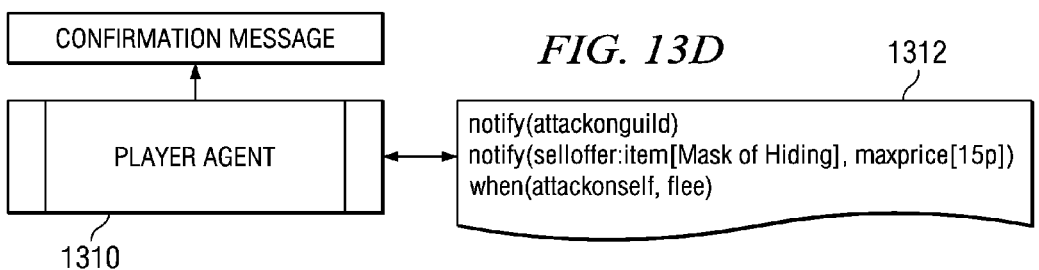

Turning to FIG. 13D, player agent 1310 removes the rule "notify(attackonself)" from offline player rules 1312. Player agent 1310 also generates a confirmation message to be returned to the offline player through a messaging client or Web interface, for example.

Figure 13E:
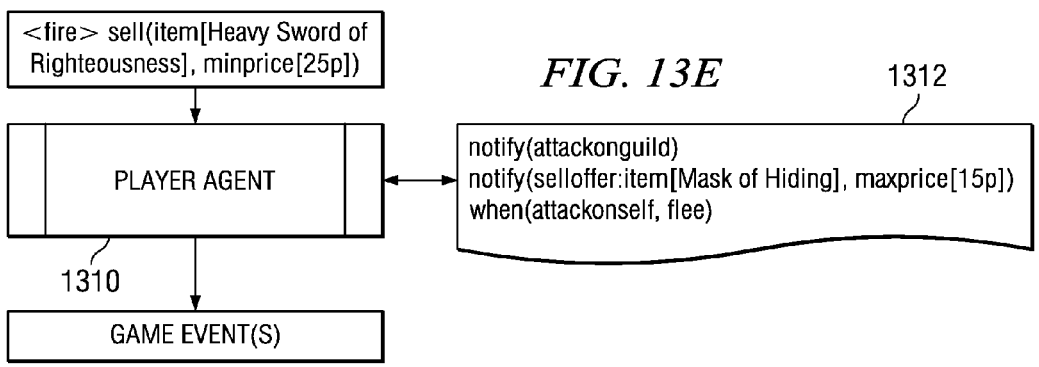

Referring now to FIG. 13E, player agent 1310 receives the following command from an offline player:

<fire> sell(item[Heavy Sword of Righteousness], minprice [25p])

In this example, the command is a one-time rule that is fired when received. Player agent 1310 generates one or more game events that are sent to the game server to perform one or a series of actions on behalf of the offline player.

Figure 13F:
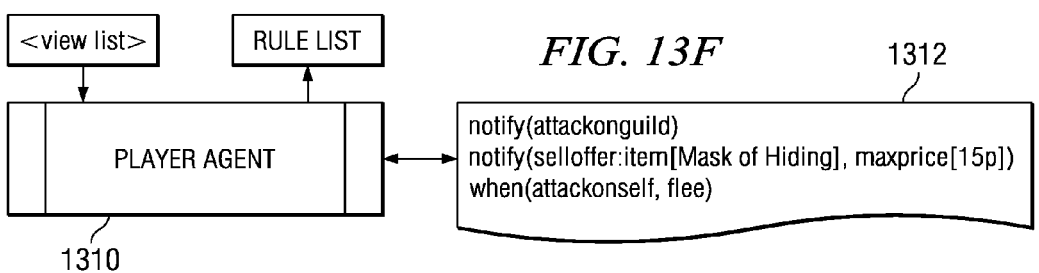

With reference to FIG. 13F, player agent 1310 receives the following command from an offline player:

<view list>

Responsive to this command, player agent simply returns a message containing a list of the current rules in offline player rules 1312.

Figure 14B:
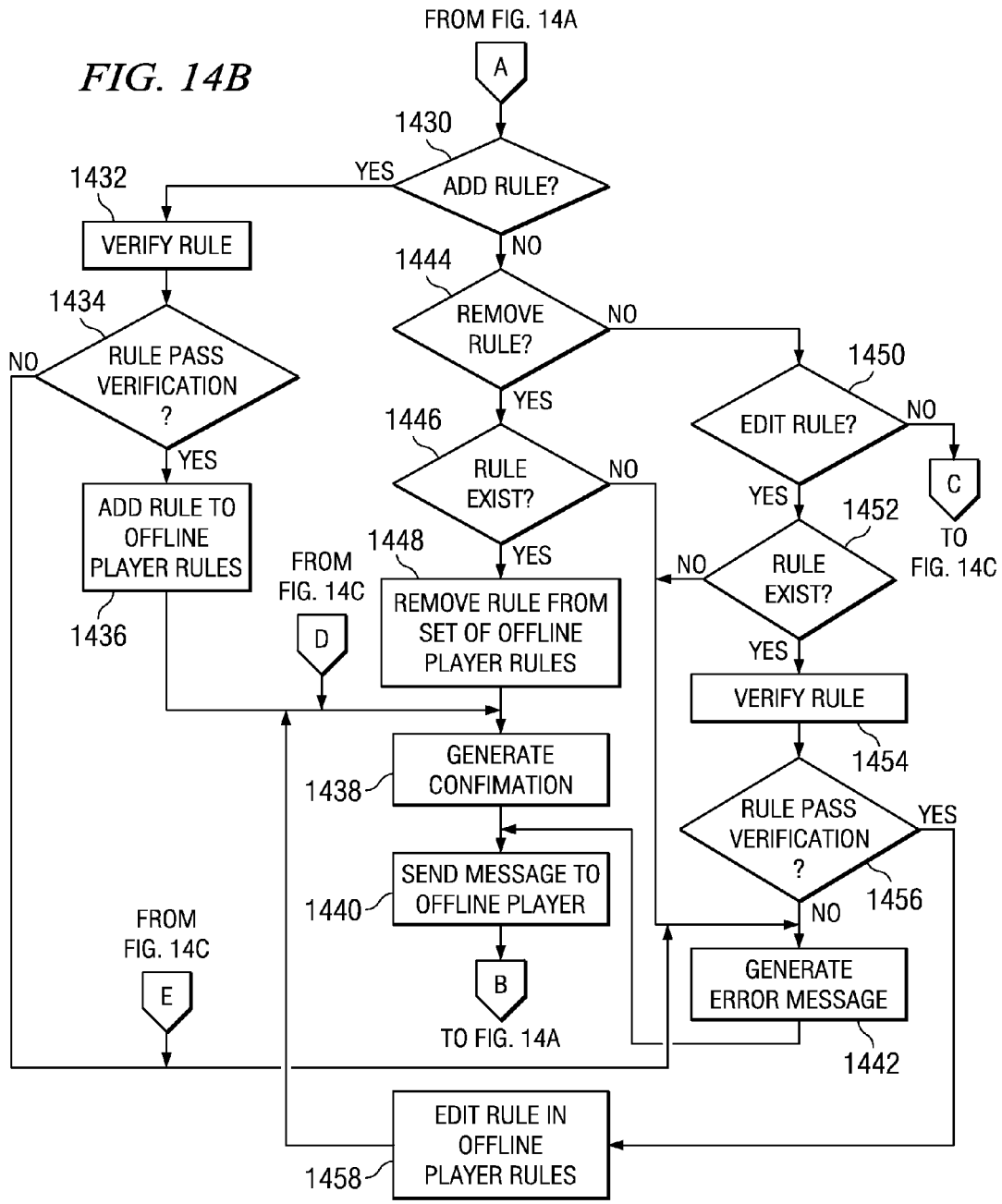

FIGS. 14A-14C present a flowchart illustrating operation of a player agent for configuring offline player behavior within a persistent world game in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means that implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With particular reference to FIGS. 14A-14C, operation begins when the player goes offline, and the player agent obtains a set of offline player rules (block 1402). The player agent activates the event monitor (block 1404). The player agent then determines whether the player is online (block 1406). The player is considered online when the player is logged into the game server through a game client. If the player is currently online, then the player agent disables the event monitor (block 1408), and operation ends.

If the player is not online—that is, the player is currently offline—then the event monitor determines whether an event is observed by or generated by the game server (block 1410). If the event monitor detects an event, the player agent determines whether the event triggers an offline player rule (block 1412). If the event does not trigger a rule, operation returns to block 1406 to determine if the player is still offline. However, if the event does trigger an offline player rule in block 1412, then the player agent determines whether the rule is an event notification rule (block 1414).

If the rule is an event notification rule, the player agent composes an event notification message (block 1416) and sends the notification message to the offline player outside of the virtual game world (block 1418). Thereafter, operation proceeds to block 1426 where the player agent determines whether a message is received from an offline player. If, however, the rule is not an event notification rule in block 1414, the player agent generates one or more reaction events (block 1422) and sends the reaction event or events to the game server (block 1424). Although not shown in FIGS. 14A-14C, in an exemplary embodiment, the player agent may also generate an event notification that informs the offline player of the outcome of the action. Thereafter, operation proceeds to block 1426 where the player agent determines whether a message is received from an offline player.

If the player agent does not detect an event in block 1410 or a detected event does not trigger a rule, the player agent determines whether a message is received from an offline player (block 1426). If the player agent does not receive a message from an offline player, operation returns to block 1406 to determine whether the player is still offline. If the player agent receives a message from an offline player in block 1426, the player agent parses the message (block 1428).

The player agent determines whether the message includes an add rule command (block 1430). If the message includes an add rule command, the player agent verifies the rule (block 1432) and determines whether the rule to be added passes verification (block 1434). If the rule to be added passes verification, the player agent adds the rule to the offline player rules (block 1436). Then, the player agent generates a confirmation message (block 1438) and sends the confirmation message to the offline player (block 1440). Thereafter, operation returns to block 1406 to determine whether the player is still offline.

If the rule does not pass verification in block 1434, the player agent generates an error message (block 1442) and sends the error message to the offline player (block 1440). Thereafter, operation returns to block 1406 to determine whether the player is still offline.

Returning to block 1430, if the command is not an add rule command, the player agent determines whether the command is a remove rule command (block 1444). If the command is a remove rule command, the player agent determines whether the rule exists in the set of offline player rules (block 1446). If the rule does not exist, operation proceeds to block 1442 where the player agent generates an error message.

If the rule exists in the set of offline player rules in block 1446, the player agent removes the rule from the set of offline player rules (block 1448). Thereafter, operation proceeds to block 1438 to generate a confirmation message.

Returning to block 1444, if the command is not a remove rule command, the player agent determines whether the command is an edit rule command (block 1450). If the command is an edit rule command, the player agent determines whether the rule exists in the set of offline player rules (block 1452). If the rule does not exist, operation proceeds to block 1442 where the player agent generates an error message.

If the rule exists in the set of offline player rules in block 1452, the player agent verifies the changes to the rule (block 1454) and determines whether the changes to the rule pass verification (block 1456). If the changes to the rule pass verification, the player agent edits the rule in the offline player rules (block 1458), and operation proceeds to block 1438 to generate a confirmation message. Otherwise, if the changes to the rule do not pass verification, then operation proceeds to block 1442 to generate an error message.

Returning to block 1450, if the command is not an edit rule command, then the player agent determines whether the command is a fire rule command (block 1460). A fire rule command is a command to execute a particular command once at the time it is received. Examples of fire once rules may include a command to place a specified item up for auction, a command to execute a script of in-game actions, or a command to flee to a specified zone or location. If the command is not a fire rule command, then the message is not one of the recognized commands, and operation proceeds to block 1442 where the player agent generates an error message. A person of ordinary skill in the art will recognize that the types of commands that are recognized may vary depending upon the implementation. For example, the player agent may recognize a view list command, as described above with reference to FIG. 13F. More or fewer commands may be recognized depending upon the implementation.

In the depicted example, if the command is a fire rule command, the player agent verifies the rule (block 1462) and determines whether the rule passes verification (block 1464). If the rule does not pass verification, operation proceeds to block 1442 where the player agent generates an error message. If, however, the rule does pass verification in block 1464, the player agent generates one or more game events (block 1466) and sends the game event, or sequence of game events, to the game server (block 1468). Thereafter, operation proceeds to block 1438 to generate a confirmation message.

Thus, the illustrative embodiments solve the disadvantages of the prior art by providing a mechanism for configuring offline player behavior within a persistent world game. A player agent for an offline player includes an event monitor that monitors for events that occur in a persistent virtual world maintained by a game server. When a game event occurs that triggers an offline player rule, the player agent may generate game events on behalf of the offline player. The player agent may also receive messages from an offline player. The messages may include commands for adding, removing, or editing offline player rules. A message may also include a command to view a list of rules or fire a one-time execution of a rule upon receipt. Therefore, a player may contribute to the persistent virtual world even when offline by sending commands using a messaging client or Web browser.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for effecting offline player behavior within a persistent virtual world online game managed by a game server, wherein the game server observes and generates game events for the persistent virtual world online game, the method comprising:

activating an offline player agent for an offline player, wherein the offline player agent has an associated set of offline player rules and wherein each offline player rule in the set of offline player rules defines an action to be taken by a character associated with the offline player on behalf of the offline player in the persistent virtual world online game responsive to a specified game event;

monitoring, by the offline player agent, for an occurrence of a game event corresponding to an offline player rule in the set of offline player rules, wherein the occurrence of the game event triggers a corresponding offline player rule from the set of offline player rules;

responsive to the game event triggering the corresponding offline player rule, generating by the offline player agent one or more offline player game events, wherein generating one or more offline player game events comprises generating a sequence of offline player game events under control of a script; and sending the one or more offline player game events from the offline player agent to the game server, as if the one or more offline player game events were generated by a game client device associated with the offline player, to effect an action on behalf of the offline player, wherein the game server prohibits attribute or skill increases that result from the sequence of offline player game events in the persistent virtual world online game.

2. The method of claim 1, further comprising:

receiving, by the player agent, a command from an offline player, wherein the command comprises a request to add, remove, edit, or activate an offline player rule.

3. The method of claim 1, further comprising:

receiving, by the player agent, a command from the offline player, wherein the command comprises a request to execute the script.

4. The method of claim 1, wherein the game server limits offline player game events to a predetermined set of tasks in the persistent virtual world online game.

5. The method of claim 1, further comprising:

receiving, by the offline player agent, a command from the offline player in a message from a messaging client associated with the offline player, wherein the command comprises a request to access the set of offline player rules;

processing the command;

responsive to the command being processed successfully, generating a confirmation message; and sending the confirmation message to the messaging client associated with the offline player.

6. A data processing system for effecting offline player behavior within a persistent virtual world online game, the data processing system comprising:

a game server that observes and generates game events for a persistent virtual world; and an offline player agent that has an associated set of offline player rules, wherein each offline player rule in the set of offline player rules defines an action to be taken on behalf of the offline player in the persistent virtual world online game responsive to a specified game event;

wherein the offline player agent monitors for an occurrence of a game event corresponding to an offline player rule in the set of offline player rules, wherein the occurrence of the game event triggers a corresponding offline player rule from the set of offline player rules;

wherein, responsive to the game event triggering the corresponding offline player rule, the offline player agent generates one or more offline player game events, wherein generating one or more offline player game events comprises generating a sequence of offline player game events under control of a script, and sends the one or more offline player game events from the offline player agent to the game server, as if the one or more offline player game events were generated by a game client device associated with the offline player, to effect an action on behalf of the offline player; and wherein the game server prohibits attribute or skill increases that result from the sequence of offline player game events in the persistent virtual world online game.

7. The data processing system of claim 6, wherein the offline player agent receives a command from the offline player, wherein the command comprises a request to add, remove, edit, or activate an offline player rule.

8. The data processing system of claim 6, wherein the player agent receives a command from the offline player, wherein the command comprises a request to execute the script.

9. The data processing system of claim 6, wherein the game server limits offline player game events to a predetermined set of tasks in the persistent virtual world online game.

10. The data processing system of claim 6, wherein the offline player agent receives a command from the offline player in a message from a messaging client associated with the offline player, wherein the command comprises a request to access the set of offline player rules;

wherein the offline player agent processes the command; and wherein responsive to the command being processed successfully, the offline player agent generates a confirmation message and sends the confirmation message to the messaging client associated with the offline player.

11. A computer program product comprising a non-transitory computer readable medium having a computer readable program embodied thereon, wherein the computer readable program, when executed on a computing device, causes the computing device to:

activate an offline player agent for an offline player, wherein the offline player agent has an associated set of offline player rules and wherein each offline player rule in the set of offline player rules defines an action to be taken on behalf of the offline player in a persistent virtual world online game responsive to a specified game event;

monitor, by the offline player agent, for an occurrence of a game event corresponding to an offline player rule in the set of offline player rules, wherein the occurrence of the game event triggers a corresponding offline player rule from the set of offline player rules;

responsive to the game event triggering the corresponding offline player rule, generate by the offline player agent one or more offline player game events, wherein generating one or more offline player game events comprises generating a sequence of offline player game events under control of a script; and send the one or more offline player game events from the offline player agent to a game server, as if the one or more offline player game events were generated by a game client device associated with the offline player, to effect an action on behalf of the offline player, wherein the game server prohibits attribute or skill increases that result from the sequence of offline player game events in the persistent virtual world online game.

12. The computer program product of claim 11, wherein the computer readable program further causes the computing device to:

receive, by the player agent, a command from the offline player, wherein the command comprises a request to add, remove, edit, or activate an offline player rule.

13. The computer program product of claim 11, wherein the computer readable program further causes the computing device to:

receive, by the player agent, a command from the offline player, wherein the command comprises a request to execute the script.

14. The computer program product of claim 11, wherein the game server limits offline player game events to a predetermined set of tasks.

* * * * *